Feb. 23, 1965   E. H. BAKER III   3,170,549
BICYCLE COASTER BRAKE
Filed June 23, 1961   3 Sheets-Sheet 2

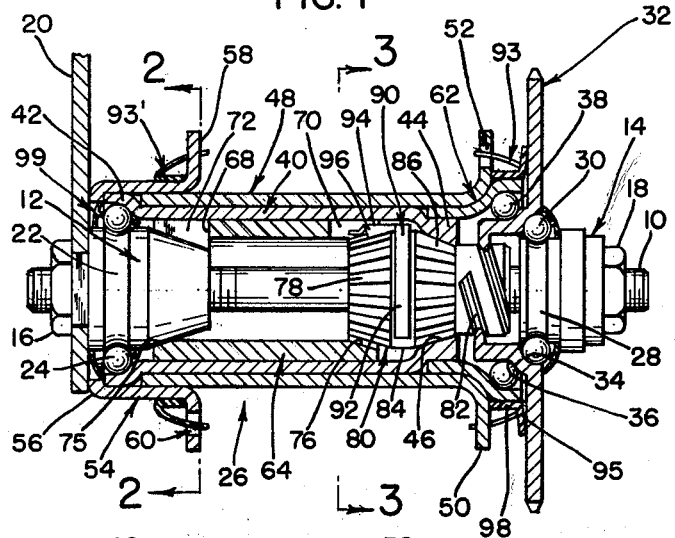

INVENTOR.
ELBERT H. BAKER, III
BY Alfred C. Body
ATTORNEY

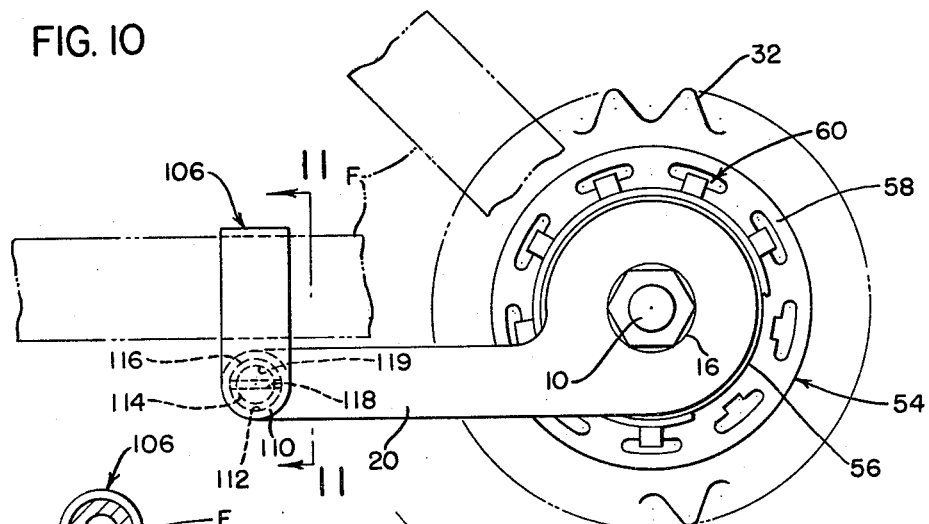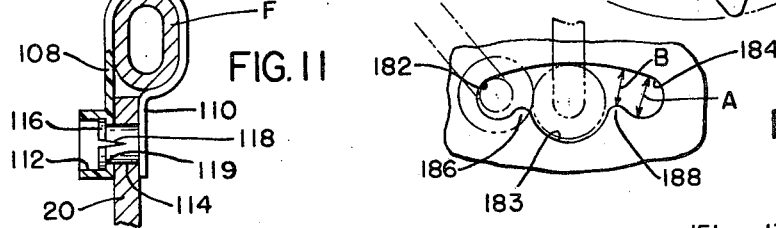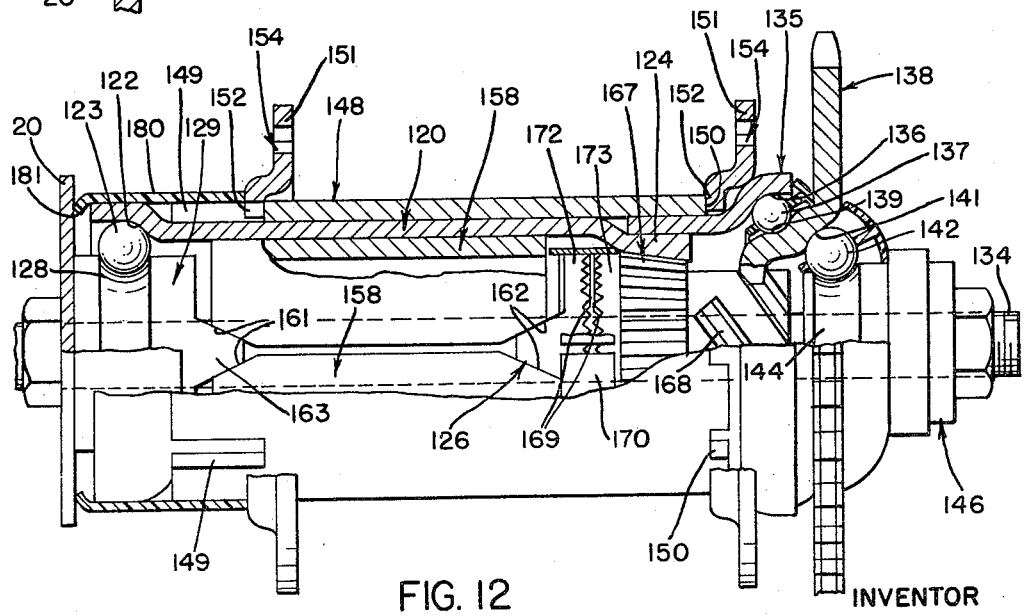

3,170,549
BICYCLE COASTER BRAKE
Elbert H. Baker III, Andover, Ohio, assignor to Gregory Industries, Lorain, Ohio, a corporation of Ohio
Filed June 23, 1961, Ser. No. 119,147
13 Claims. (Cl. 192—6)

This invention relates to the art of bicycle coaster brakes, and more particularly to a bicycle coaster brake assembly which can be manufactured at minimum cost without sacrificing quality, and which facilitates assembly of the spokes with the brake drum.

One of the principal problems with bicycle coaster brakes has been the high cost of manufacture and assembly. Such brakes have been manufactured from a large number of relatively complicated parts, most of which were machined to shape, such machining requiring the removal of large amounts of metal to quite accurate tolerances. Furthermore, the principal part, namely, the hub, had portions forming braking surfaces, portions forming bearing surfaces and portions with spoke holes formed therein. The hub, after machining, had to be selectively coated or plated so that a subsequent carburizing process would harden only the braking and bearing surfaces while leaving the spoke hole portions in an unhardened state; and then following the hardening process, the hub had to be again selectively plated or coated in order that a chrome plating operation would occur only on the outer surface of the hub.

A further problem with bicycle coaster brakes has been in the time required to assemble the spokes with the hub. Heretofore the hub had flanges with spoke holes therethrough. Each individual spoke was inserted outer end first through the spoke hole until the headed inner end engaged the flange. Thereafter the spokes were fastened to a wheel rim. This procedure is time consuming and expensive and does not lend itself to efficient mass production techniques.

A still further problem with bicycle coaster brakes has been the time required to fasten the strap holding the end of the brake arm to the bicycle frame. Heretofore such straps were of metal and were carefully placed in position on the frame and fastened to the arm with a conventional nut and bolt, a time consuming operation.

As a primary object, the present invention provides a bicycle coaster brake assembly which overcomes all of the above-referred to difficulties and others, and yet provides a coaster brake of good quality which is relatively cheap to manufacture and which facilitates assembly of the spokes with the brake hub.

Another object of the invention is to provide a new and improved expansible brake shoe member for a bicycle coaster brake which may be at least partially stamped from sheet metal.

A further object of the invention is to provide a new and improved drag spring for a bicycle coaster brake.

Still another object of the invention is to provide a new and improved strap, requiring no separable fastening elements, for securing a bicycle coaster brake arm to the frame of the bicycle.

A still further object of the invention is to provide a bicycle wheel hub wherein the spokes may simply be snapped in place and held there until fastened to the wheel rim.

A still further object of the invention is the provision of a new and improved strap for tying the brake arm to the bicycle frame which may be quickly snapped into place.

In accordance with one aspect of the present invention, the hub, instead of being machined as an integral piece from a solid block of metal, is so arranged that it is made up of a plurality of members stamped from sheet metal and assembled into a unitary hub structure. In accordance with one aspect of the invention, the members are permanently secured together by means of a cement such as one of the epoxy resins.

In another aspect of the invention, certain of the stamped members of the brake are so shaped and arranged as to form opposed ball races for coaction with the ball bearings. It has been found that notwithstanding the fact that these ball races are stamped, the tolerances are such as to be satisfactory for the reception of ball bearings without the necessity for expensive machining operations.

Further, in accordance with the invention, an expansible braking member is provided comprised of a cylinder split along a line extending substantially parallel to the axis of the brake and additionally having a plurality of axially-extending slots on its outer periphery, these slots having a depth at least equal to 25% of the total wall thickness of the member.

In accordance with still another aspect of the invention, the spoke holes each have at least a portion large enough to pass the headed end of the spoke into the hole in combination with yieldable means for permitting positioning of the head in the spoke hole, headed end first and thereafter retaining same in position. This may be accomplished by means of a flexible plastic ring in combination with a metal hub having spoke holes with rigid walls or the flange itself may be formed from a flexible plastic and the walls or portions thereof defining the spoke hole are yieldable to give the desired locking action.

Further in accordance with the invention, the strap for tying the end of the brake arm to the frame of the bicycle is made of a flexible ribbon having a quick closing fastener on the ends thereof whereby when the hub is assembled on the bicycle the brake arm may be quickly and easily tied to the frame.

The above and other objects and features of the invention will become apparent from the following detailed description taken in connection with the accompanying drawings which form a part of this specification, and in which:

FIGURE 1 is a cross-sectional view of a bicycle coaster brake assembly constructed in accordance with the teachings of the present invention;

FIGURE 2 is a cross-sectional view taken along line 2—2 of FIGURE 1;

FIGURE 3 is a cross-sectional view taken along line 3—3 of FIGURE 1;

FIGURE 4 is an enlarged fragmentary view of portions of FIGURE 1 showing the arrangement for enabling insertion of the spokes into the spoke holes head end first and for retaining same;

FIGURE 5 is a cross-sectional view of FIGURE 4 taken approximately on the lines 5—5 thereof;

FIGURE 6a is a cross-sectional view of FIGURE 6 taken on the line 6a—6a;

FIGURE 10 is a view of the left end of the brake assembly shown in FIGURE 1 and illustrating the manner in which the coaster brake arm is fastened to the frame of the bicycle;

FIGURE 11 is a partially broken-away inverse section taken on line 11—11 shown in FIGURE 10 showing the strap for connecting the bicycle coaster brake arm to the frame of the bicycle;

FIGURE 12 is a partially broken-away cross-sectional view of an alternative embodiment of the invention, the view being taken on an offset section line to better illustrate the construction; and FIGURE 13 is an enlarged view of an alternative form of spoke hole employing detents to hold the spokes in locked position.

Figure 6:
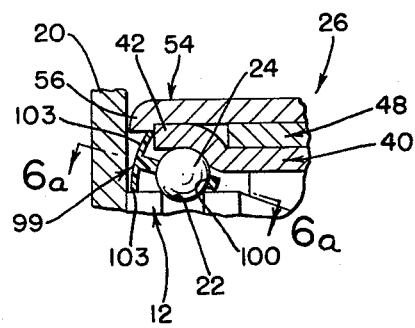
FIGURE 6 is an enlarged fragmentary view of FIGURE 1 showing the bearing retaining and dirt seal ring.
Figure 6A:
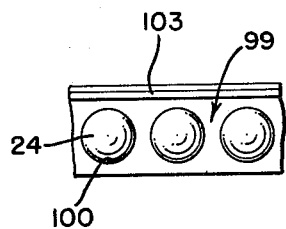

Referring now to the drawings which are for the purpose of illustrating a preferred embodiment of the invention only and not for the purpose of limiting the same, FIGURE 1 shows a bicycle coaster brake assembly comprised of a supporting shaft 10 having a stationary cone 12 and an adjusting cone 14 threaded onto its opposite ends and locked in position by means of nuts 16 and 18. Secured between the nut 16 and cone 12 is a brake arm 20 which is secured to the frame of the bicycle to prevent rotation of shaft 10 and cones 12 and 14 as will be described hereinafter.

Formed on the cone 12 is an annular ball race 22 which receives a plurality of ball bearings 24 for rotatably supporting one end of a hub assembly, generally indicated at 26. Similarly, the cone 14 is provided with a ball race 28 which receives ball bearings 30 for rotatably supporting a stamped drive sprocket 32. Stamped into the sprocket 32 are ball races 34 and 36 on its inner and outer peripheries, respectively, with race 34 receiving the ball bearings 30. The race 36 on the outer periphery of sprocket 32 receives ball bearings 38 which, in turn, rotatably support the other or right end of the hub assembly 26.

As shown, the hub assembly 26 comprises a stamped inner cylindrical member 40 having its left end flared radially outwardly as at 42 to form a ball race for the reception of ball bearings 24. The other end of the inner cylindrical member 40 is flared radially inwardly as at 44 and has a tapered surface 46 on its inner periphery, this surface also being formed in a stamping operation. Telescopically fitted over the inner cylindrical member 40 is an outer cylindrical member 48 which is secured to member 40 by means of a cement such as one of the epoxy resins. The left end of the cylindrical member 48 abuts the flared portion 42 of member 40 as shown, while the right end of this same member is bent radially outwardly into a flange 50 having spoke holes 52 circumferentially spaced therearound. Telescopically fitted over the flared portion 42 of member 40 and the left end of outer cylindrical member 48 is a cylindrical end hub portion 54 which is also secured to the members 40 and 48 by any suitable means but preferably and in accordance with one aspect of the invention by cement. The left end of hub portion 54 is bent radially inwardly in a stamping operation as at 56 to provide an annular shoulder which abuts the left end of cylindrical member 40; while the right end of the hub portion 54 is bent radially outwardly into a flange 58 having spoke holes 60 therein. Interposed between the radially inwardly flared portion 44 of cylindrical member 40 and the right end of member 48, as shown in FIGURE 1, is a stamped annular ball race 62 which receives the ball bearings 38. The ball race 62 is also suitably secured to members 40 and 48 but preferably by means of epoxy resin cement. It has been found that, contrary to expectations, the members 40, 48, 58 and 62 can be securely bonded together into a unitary structure by the cement without the need for crimping, welding, or pressing operations, although such securing methods are not excluded from the broader aspects of the invention.

Figures 7, 8, 9, 14:
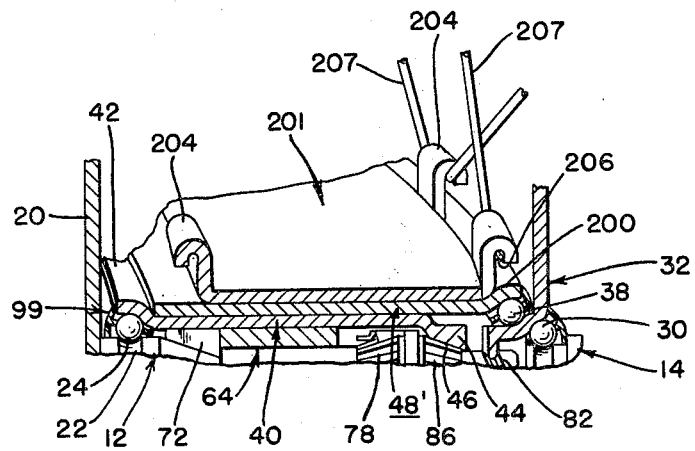
FIGURE 7 is a cross-sectional view of the brake band shown in FIGURE 1.
FIGURES 8 and 9 are cross-sectional and end views, respectively, of the drag spring employed in the brake of FIGURE 1.
FIGURE 14 is a fragmentary view of a still further arrangement embodying the present invention.

Disposed within the inner cylindrical member 40 is a cylindrical brake shoe member 64, best shown in FIGURE 7, which is a cross-sectional view taken along the axis of the shoe. The brake shoe member comprises an outer cylindrical shell which is split along line 66 extending substantially parallel to the longitudinal axis of the shoe. Formed in the opposite edges of the shoe are notches 68 and 70, respectively. As shown in FIGURES 1 and 2, the notch 68 receives an axially-extending key 72 on the cone 12, the arrangement being such that when the key extends into the notch 68, the member 64 will be locked against rotation. The inner peripheral edges of the member 64 are beveled as at 75 and 76, with the surface 75 engaging the tapered surface of cone 12. The other tapered surface 76 on the member 64 is adapted to receive the beveled, knurled surface 78 of a drive screw, generally indicated at 80.

The drive screw 80 is axially slideable on the supporting shaft 10 and is provided on its one end with double or triple start threads 82 which receive cooperating threads stamped into the inner periphery of the sprocket 32. Interposed between the beveled surface 78 and the threads 82 is a narrow cylindrical surface 84 and a second beveled, knurled surface 86. Surface 86 is beveled radially inwardly toward the sprocket 32 whereby rotation of the sprocket in one direction will cause the drive screw 80 to move to the right and engage the beveled surface 46 on cylindrical member 40 to drive the hub assembly 26. When, however, sprocket 32 is rotated in the opposite direction, the drive screw 80 will slide to the left as shown in FIGURE 1 whereby the beveled surface 78 will engage surface 76 on the inner periphery of the left end of brake shoe 64. As will be understood, the action of drive screw 80, in being forced to the left and into engagement with surface 76, tends to expand the split brake shoe member radially outwardly. It has been found, however, that a brake shoe of constant radial wall thickness around its periphery will not have sufficient flexibility to expand when surface 78 is forced into engagement with surface 76. Accordingly, in accordance with the invention, axially-extending slots or notches 88, best shown in FIGURES 2 and 3, are circumferentially spaced around the periphery of the brake shoe. In order to give the brake shoe member sufficient radial flexibility, the maximum depth of the grooves 88 must be at least equal to 25% of the thickness of the brake shoe member. Furthermore, at least two grooves 88 must be provided in the periphery of the brake shoe member, with six grooves being preferred.

Surrounding the cylindrical portion 84 of the drive screw 80 is a drag spring, generally indicated at 90 and shown in detail in FIGURES 8 and 9. The drag spring, like the various other parts of the brake, is stamped from sheet metal and includes a split annular band 92 which rides on the cylindrical surface 84. Extending outwardly from the top of band 92 is a finger 94 which extends into the slot 70 formed at the end of the brake shoe 64. Integral with the finger 94, at the left end thereof, are a pair of projections 96 which extend radially inwardly and into engagement with the knurls on beveled surface 78. Since the finger 94 extends into slot 70, and since the brake shoe 64 is locked against rotation by virtue of key 72 on cone 12, the drag spring 90 cannot rotate with the drive screw 80; and, when no driving force is being applied to the sprocket 32, the drag spring will resist any rotation of the drive screw and sprocket by virtue of the frictional resistance presented between the projections 96 and the knurls on surface 78, as well as the frictional resistance presented between the inner periphery of band 92 and cylindrical surface 84.

Spokes as normally employed are of an elongated wire 89 (see FIGURES 4 and 5) having a right angled shank 89' at the inner end terminating in a head 92.

In assembling a spoke with the hub it has heretofore been common to thread the outer end of a spoke through the spoke hole 52 until the inner headed end 92 came to bear against the side of the flange and thereafter fasten the outer end of the spoke to a wheel rim. In accordance with the present invention, however, this costly and time consuming process is eliminated by virtue of a new and improved spoke hole arrangement, best shown in FIGURES 4 and 5. Thus the spoke hole 52 is comprised of an opening 94' large enough to pass the head 92 and having a pair of communicating smaller openings 97 on either circumferential side thereof. Projecting into the area of the enlarged opening 94' is a yieldable member in the form of an axially-extending flexible tab 91 formed in a nylon spoke lock ring 93. The spoke lock ring 93 includes a base 98 fitting over the member 62 and a radial flange 95. A plurality of such tabs 91, one for each spoke hole, are provided spaced around the ring 93. The ring 93 comprises a cylindrical portion having a radially-extending flange 95, with the tabs 91 being formed in the flange 95. The tab 91 has a circumferential width slightly less than the width of the opening 94' in its normal unflexed position and has its radially outer surface outwardly of the radially inner surface of the openings 97 and its radially inner surface inwardly thereof. This latter feature locates and prevents the ring 93 from turning relative to the spoke holes.

With this arrangement, the head 92 of the spoke is inserted through the enlarged portion 94' while forcing the yieldable or flexible tab 91 away from the spoke hole. Thereafter, the shank portion 89' of the spoke is shifted into one of the portions 97 and the tab 91 then snaps back into it original position in front of the enlarged head 92 to thereby retain the spoke in position. After the first spoke is inserted into its associated opening 94', the foregoing process is repeated from the opposite side of the flange and a second spoke is inserted into the second smaller opening. As best shown in FIGURES 2 and 3, a plurality of such spoke holes 52 and 60 are circumferentially spaced around the flanges 50 and 58, and two spokes are inserted into each of the spoke holes and snapped into place in the manner described above. Thus, the costly and time consuming process of threading each individual spoke out end first through an associated spoke hole is eliminated. Obviously, a round hole large enough to pass the head 92 may be employed with the flexible tab 91 so arranged as to permit direct insertion of the head 92, to prevent or impede removal therefrom.

It is to be appreciated that the yieldable means only function to prevent accidental displacement of the spoke from the hole until the spoke is assembled with the wheel rim. Thereafter the spoke is under tension and is held in assembled relationship by the position of the shank 89 in the hole and the engagement of the head 92 against the side of the flange.

The radial flange 95 tapers axially toward and lightly engages the sprocket 32 to provide a seal at this point preventing dirt from entering the bearing 38.

The spoke holes 60 are identically shaped and a retaining ring 93' is employed identical with the ring 93 except for the elimination of the flange 95.

The coaster brake shown in FIGURE 1 employs three separate sets of ball bearings 30, 38 and 24. One of the problems with such ball bearings is holding them in proper relationship prior to the time that they are assembled into the coaster brake, at which time the coaster brake itself forms the ball race and holds the balls in place. After assembly, the problem is to keep dirt, water and the like from getting into the bearings where such dirt and/or water causes undue wear and/or rusting.

The present invention contemplates an improved arrangement for both holding the balls of the ball bearing in the proper relationship prior to and during assembly into the coaster brake and after such assembly for sealing the bearing from the ingress of dirt and water. Thus, and as more specifically shown in FIGURE 6, a ring T-shaped in cross section 99 is provided wherein the vertical leg of the T forms a retaining ring for the balls and the horizontal legs form a grease and dirt seal.

Thus, the vertical leg is in the shape of a short, truncated cone having a plurality of transverse openings 100 therethrough, each adapted to receive one of the balls, e.g., 24 of the ball bearing. The walls of the openings 100 preferably define a frustum of a sphere with a diameter just slightly greater than the ball diameter. The thickness of the leg is such that the diameter of the openings in the plane of the surface of the leg is less than the ball diameter such that the balls 24 may be snapped into and within the openings 100.

The horizontal legs 103 of the T extend outwardly and the end of one leg lightly touches the outer surface of the cone 12 while the end of the other leg lightly touches the axial end of the member 40 and the end of the flange 56, generally as is shown in FIGURE 6. Preferably, these horizontal legs are relatively thin and may taper down to a feather edge so as to have the maximum flexibility such that they engage the rotating parts of the brake with a minimum force and thereby create a minimum of friction. However, they are still able to provide the desired sealing action.

The ring 99 may be formed of any desired material, but it is preferably formed of nylon or the like which has the required mechanical strength, is oil resistant, has a minimum coefficient of friction against steel, is resistant to abrasion, and is sufficiently flexible to enable the ball 24 to be readily inserted in the openings 100.

The ball retaining and grease seal rings on the other ball bearings are similarly constructed.

FIGURE 10 illustrates the connection of the brake arm 20 to the bicycle frame, schematically indicated at F. The arm 20 is fastened at its free end to the frame member by means of a strap 106 as in conventional practice. In this case, however, the strap 106, as shown in FIGURE 11, is formed from a thin flexible material such as nylon or other similar plastic material, and has a pair of legs 108 and 110, one of which has an enlarged opening 112 therein. The other leg 110 has a pin 114 fastened thereto. Pin 114 has an enlarged head 116 and this head is split as at 118 whereby the pin may be forced into the opening 112 and retained there by shoulder 119. The strap is installed by simply slipping it over the bicycle frame and arm 20 and snapping the pin 114 into the opening 112. To remove the strap, the plastic material surrounding opening 112 is merely slipped over the enlarged head 116, as will be understood. The device thus eliminates the time consuming assembly procedure of snapping a metal clip over the bicycle frame aligning its openings with the opening in the end of the brake arm, inserting a screw, and assembling and tightening a nut.

In the alternative embodiment of FIGURE 12, the hub is again made up of a plurality of simple and economically manufactured pieces, all held in assembled relationship by means of suitable retaining means such as brazing or cement. The hub is thus comprised of an inner cylindrical member 120 the inner surface of which forms the braking surface. The member 120 at its left end is flared to form a ball race 122 for the reception of ball bearings 123 and at its right end is contracted in diameter to form a thickened portion 124 of reduced outer diameter with an inwardly facing tapered surface adapted to engage a correspondingly tapered surface on a drive member 167.

Ball bearings 123 ride in a race 128 provided in a stationary cone 129 threaded onto one end of a supporting shaft 134. This member 120 is generally identical to the corresponding member of FIGURE 1. A second cylindrical member 135 fits over the reduced diameter portion 124 and has an outwardly curved or flared portion 136 forming an outer race for ball bearings 137 which also ride on an inner race 139 formed on a drive sprocket 138. The drive sprocket in turn forms a second ball race 141 which receives ball bearings 142 circumferentially spaced around a race 144 formed in a second adjusting cone 146 threaded onto the right end of the shaft 134.

Telescopically fitted over the inner cylindrical member 120 is an outer cylindrical member 148 which is cut from a tube and is secured to the member 120 by any suitable means but preferably by a non-metallic cement. This member has slots 149, 150 cut into its opposite ends, generally on the same longitudinal line. Two flanges 151, each having spoke holes 154 circumferentially spaced therearound snugly fit, one over each end of the member 148. These flanges 151 each have lugs 152 which fit into the slots 149, 150. The lugs on one flange are circumferentially offset from the lugs on the other flange in relation to the spoke holes so that when the flanges are assembled on the member 148, the spoke holes of the two flanges will be circumferentially offset one from the other as is conventional in the art. Thus the flanges 151 are identical except for the relative location of the lugs. It will be appreciated that these lugs could be identically positioned and the slots 149, 150 circumferentially offset one from the other. The construction of this outer member 148 and the flanges is important to the ability to manufacture a brake hub at a minimum of expense.

In this embodiment of the invention, the expansible brake shoe is made up of two semi-cylindrical brake shoe members 158 each having an outer cylindrical surface adapted to be forced into pressure friction engagement with the inner surface of the inner cylindrical member 120. Thus, these members 158 each have circumferentially facing and opposed wedge surfaces 161, 162, one at each end thereof. Surfaces 161 engage corresponding wedge surfaces on a wedge member 163 integral with the stationary cone 129. Surfaces 162 engage complementary wedge surfaces on a drive wedge member 126 which member is axially slidable on the shaft 134. Wedge member 126 is moved axially by a drive member 167 having double or triple start threads 168 formed in its right hand end which engages cooperating threads stamped into the drive sprocket 138. The wedge member 126 and drive member 167 have complementary coacting axially facing knurled surfaces 169 and a drag spring 170 surrounds and frictionally engages both cylindrical portions 172, 173 of the wedge and drive member.

When the drive member 167 is moved to the left, it locks to drive wedge member 126 and then wedge member 126 along with wedge section 163 of stationary cone 129 wedges the brake shoe members 158 radially outwardly into pressure engagement with the member 120 to create frictional braking action. When the drive member 167 is moved in the opposite direction, the knurled surfaces are free of each other and the wedge surface on the drive member 167 engages the tapered surface of the inner member 120 to rotate the hub and move the bicycle forward.

A nylon dust cover 180 is slipped over the left hand end of the assembly and has an edge 181 which engages the arm 20 to prevent dust from entering the bearings.

In FIGURE 13 another embodiment for facilitating assembly of the spokes in the spoke hole is shown which, like the embodiment of FIGURE 4, comprises an opening having an enlarged portion 183 therein together with two communicating smaller portions 182 and 184. In this case, however, detents 186 and 188 project into the spaces between the central enlarged portion 183 and its communicating portions 182 and 184. Thus, the dimension A is larger than dimension B. The flanges having the spoke holes therein are formed from a slightly yieldable material such as nylon and the spoke is inserted into enlarged portion 183 and thereafter snapped over the detent into one of the two smaller portions 182 or 184 where it will be retained in position. In this latter case, the necessity for the nylon spoke lock rings 93, 93' shown in FIGURE 1 is, of course, eliminated. Obviously, if the flanges are made of a plastic, the entire hub can be made of such plastic, e.g., nylon.

FIGURE 14 shows a still further alternative embodiment of the invention wherein the spokes, wheel and hub of the coaster brake may be pre-assembled prior to assembly with the remainder of the parts of the coaster brake. In this embodiment of the invention, like parts will be referred to by like numbers and similar parts with the same number with a prime mark added.

Thus, the inner cylindrical member 40 is the same as shown in the preferred embodiment. A second cylindrical member 48' is telescoped over the member 40. This member 48' is cylindrical at its left end and at its right end terminates in a slight outwardly flaring portion 200, the inner arcuate surface at the flare forming the outer ball race for the bearing 38. Thus, in this embodiment of the invention the members 48 and 62 are made as a single unit and the flange 50 has been eliminated from the cylindrical member 48. In a like manner, this embodiment of the invention eliminates the member 54. Instead, a sleeve 201 of a diameter to snugly fit over the outside of the member 48' is provided which sleeve at both axial edges is provided with a plurality of circumferentially spaced radially outwardly extending hook members 204, each defining a radially inwardly facing passage into which the apex 206 of a V-shaped spoke is positioned. The legs 207 of the spoke extending radially outwardly in a diverging direction to fasten to the rim of the wheel in a conventional manner.

With this construction, the sleeve 201 is first pre-assembled with the spokes and the bicycle wheel. The remainder of the brake may be separately assembled and then the wheel with its sleeve 201 and the remainder of the parts of the coaster brake may be separately brought together at any desired time. The sleeve 201 may be fastened to the sleeve 48' by any suitable means but preferably by an epoxy cement.

Although the invention has been shown in connection with certain specific embodiments, it will be readily apparent to those skilled in the art that various changes in form and arrangement of parts may be made to suit requirements without departing from the spirit and scope of the invention.

The present application is an improvement on the brake described and claimed in my copending application Serial No. 798,782, filed March 11, 1959, now Patent No. 3,110,379, issued November 12, 1963.

Having thus described my invention, I claim:

1. In a bicycle coaster brake assembly including a supporting shaft, a drive sprocket rotatably supported on the shaft at one end thereof, and a hub rotatably supported on the drive sprocket at one end and on the shaft at the other end; the improvement in said hub comprising a first cylindrical member having its one end flared outwardly to form a ball race for the reception of ball bearings interposed between said race and the supporting shaft, a second cylindrical member telescopically fitted over said first member and having its one end abutting said flared end of the first member and at its other end having an outwardly-extending flange with spoke holes formed therein, a third cylindrical member telescopically fitted over the flared end of the first cylindrical member and a portion of said second cylindrical member, said third cylindrical member having its one end flanged inwardly to at least partially cover the ball race formed in said first member and an outwardly-extending flange at its other end with spoke holes formed therein, and a fourth cylindrical member abutting the inner periphery of said second cylindrical member at said other end thereof and having a ball race formed therein for the reception of ball bearings interposed between the hub and said drive sprocket.

2. The improvement in a hub for a bicycle coaster brake as claimed in claim 1 wherein the first, second, third and fourth cylindrical members are all stamped from sheet metal and wherein the cylindrical members are all cemented together with an epoxy resin cement.

3. In a bicycle coaster brake assembly including a supporting shaft, a drive sprocket rotatably supported on the shaft at one end thereof, and a hub rotatably supported on the drive sprocket at one end and on the shaft at the other end; the improvement in said hub including a first cylindrical member, a second cylindrical member telescopically fitted over said first member and having at its one end an outwardly-extending flange with spoke holes formed therein, a third cylindrical member telescopically fitted over the end of said second member opposite said outwardly-extending flange, said third cylindrical member having at its one end an outwardly-extending flange with spoke holes formed therein, said first, second and third cylindrical members all being secured together, and means for rotatably supporting opposite ends of the hub on the drive sprocket and the supporting shaft, respectively.

4. A bicycle coaster brake assembly comprising a supporting shaft, a drive sprocket rotatably supported on the shaft at one end thereof, a hub rotatably supported on the drive sprocket at one end and on the shaft at the other end, said hub comprising a first cylindrical member having its one end flared outwardly to form a ball race for the reception of ball bearings interposed between said race and the supporting shaft, the other end of said cylindrical member being flared inwardly to form a tapered clutch surface on the inner periphery thereof, a second cylindrical member telescopically fitted over said first member and having its one end abutting said flared end of the first member and at its other end having an outwardly-extending flange with spoke holes formed therein, a third cylindrical member telescopically fitted over the flared end of the first cylindrical member and a portion of said second cylindrical member, said third cylindrical member having its one end flanged inwardly to at least partially cover the ball race formed in said first member and an outwardly-extending flange at its other end with spoke holes formed therein, a fourth cylindrical member abutting the inner periphery of said second cylindrical member at said other end thereof and having a ball race formed therein for the reception of ball bearings interposed between the hub and said drive sprocket, a drive screw axially slideable on said shaft and threadedly engaging said sprocket, and a tapered annular surface on said drive screw adapted to engage said tapered surface on the inner periphery of said other end of the first cylindrical member whereby rotary motion may be transmitted from the sprocket to the hub.

5. In a bicycle coaster brake assembly including a supporting shaft, a drive sprocket rotatably supported on the shaft at one end thereof, and a hub rotatably supported on the drive sprocket at one end and on the shaft at the other end; the improvement in said hub comprising an inner cylindrical member stamped from sheet metal, an outer cylindrical member telescopically fitted over said inner cylindrical member having axially extending aligned circumferentially spaced slots in each end, and annular flanges secured on each end of said outer cylindrical member having spoke holes formed therein and having radially extending lugs on the inner peripheries thereof received in said slots, the lugs of one flange being circumferentially offset with respect to the lugs of the other flange to provide a corresponding offset for said spoke holes.

6. In a bicycle coaster brake assembly as set forth in claim 5, wherein said outer cylindrical member is stamped from sheet metal and said flanges are brazed thereto.

7. In a bicycle coaster brake assembly as set forth in claim 5 wherein said telescoped cylindrical members are secured together with an epoxy resin cement.

8. In a bicycle coaster brake, a first inner cylindrical member having at one end an outwardly flared portion defining on the inner surface thereof a ball race and on the other end an inwardly flared portion defining on the inner surface thereof a driving surface, a second cylindrical member telescoped over the outer surface of said first cylindrical member and having an outwardly flared end opposite from the outwardly flared end of said first cylindrical member and defining on the inner surface thereof a ball race and a third cylindrical member telescoped over said second cylindrical member and having at each axial end means for coacting with spokes of a bicycle and means rigidly securing all of said members in firmly assembled relationship.

9. The bicycle hub of claim 8 wherein said third cylindrical member has at each axial end radially extending flanges each with a plurality of spoke holes therethrough.

10. The brake hub of claim 8 wherein said third cylindrical member has at each exial end a plurality of members defining radially inwardly facing hooks adapted to coact with the apex of V-shaped spokes.

11. In a bicycle coaster brake arrangement including a shaft, a drive sprocket journaled on said shaft, a hub journaled at one end on said shaft and at the other end on said sprocket, the improvement which comprises: said hub, including an outer hub, including a cylindrical portion and a radially outwardly extending flange having spoke holes formed therein, an end hub spaced from said flange and including a cylindrical portion telescoped over said first cylindrical portion and having an outwardly extending flange having spoke holes formed therein and a brake hub inwardly of said first mentioned cylindrical portion and means holding said hubs in fixed relationship.

12. In a bicycle coaster brake assembly including a shaft, a drive sprocket rotatably supported on the shaft and a hub rotatably journaled on the drive sprocket at one end and on the shaft at the other end, the improvement which comprises a three-piece hub, one of said pieces including a cylindrical portion journaled at one end on said drive sprocket, said second piece including a cylindrical portion telescoped inside the opposite end of said cylindrical portion of said first piece and having an inner tapered surface thereon adapted to be engaged by a drive screw for forcefully rotating said hub, said second piece including a second cylindrical portion journaled on said shaft, said third piece including a cylindrical portion telescoped outside of said cylindrical portion of said first piece and means fastening all of said pieces in rigid assembled relationship.

13. In a bicycle coaster brake arrangement, including a shaft, a drive sprocket journaled on said shaft, a hub journaled at one end on said shaft, and at the other end on said sprocket, the improvement which comprises: said hub including an outer hub member including a cylindrical portion terminating at one end in a radially outwardly extending flange having spoke holes formed therein; a brake hub member radially inwardly and engageable with the cylindrical portion of said outer hub and a second outer hub member spaced from the flange of said first-mentioned outer hub and including a cylindrical portion telescoped over both of said first-mentioned hub members and having an outwardly extending flange having spoke holes formed therein.

References Cited in the file of this patent

UNITED STATES PATENTS

| | | |
|---|---|---|
| 1,023,347 | Whittington | Apr. 16, 1912 |
| 1,340,386 | Emerson | May 18, 1920 |
| 1,529,089 | Scholes | Mar. 10, 1925 |
| 1,567,638 | Dean | Dec. 29, 1925 |
| 2,016,048 | Pressentin | Oct. 1, 1935 |
| 2,473,177 | Sherwood | June 14, 1949 |
| 2,550,912 | Goodwin | May 1, 1951 |
| 2,552,484 | Hood | May 8, 1951 |
| 2,798,771 | Douglas | July 9, 1957 |
| 2,837,187 | Hood | June 3, 1958 |
| 2,896,889 | Hershberger et al. | July 28, 1959 |
| 2,897,024 | Chenea | July 28, 1959 |
| 2,969,216 | Hallsey | Jan. 24, 1961 |

FOREIGN PATENTS

| | | |
|---|---|---|
| 541,872 | France | May 9, 1922 |
| 1,069,559 | France | Feb. 10, 1954 |
| 1,104,870 | France | June 22, 1955 |
| 546,770 | Italy | Aug. 1, 1956 |